US006981691B2

(12) United States Patent
Caprera

(10) Patent No.: US 6,981,691 B2
(45) Date of Patent: Jan. 3, 2006

(54) DUAL SEGMENT BALL VALVE

(75) Inventor: Brian J. Caprera, Warwick, RI (US)

(73) Assignee: Dresser, Inc., Addison, TX (US)

( * ) Notice: Subject to any disclaimer, the term of this patent is extended or adjusted under 35 U.S.C. 154(b) by 31 days.

(21) Appl. No.: 10/688,778

(22) Filed: Oct. 17, 2003

(65) Prior Publication Data

US 2005/0082506 A1    Apr. 21, 2005

(51) Int. Cl.
    *F16K 5/06*    (2006.01)
(52) U.S. Cl. ............. 251/298; 251/315.07; 251/315.16
(58) Field of Classification Search ........... 251/315.16, 251/315.01, 298, 315.07
    See application file for complete search history.

(56) References Cited

U.S. PATENT DOCUMENTS

| | | |
|---|---|---|
| 3,191,906 A | 6/1965 | Zeigler et al. |
| 3,403,887 A | 10/1968 | Myers |
| 4,111,393 A | 9/1978 | McClurg et al. |
| 4,157,170 A | 6/1979 | McClurg |
| 4,557,461 A | 12/1985 | Gomi et al. |
| 4,660,591 A | 4/1987 | Brown et al. |
| 4,989,833 A | 2/1991 | Polón |
| 5,016,857 A | 5/1991 | Bovee et al. |
| 5,152,503 A * | 10/1992 | Conway ................ 251/315.14 |
| 5,205,533 A | 4/1993 | Berchem |
| 5,524,863 A | 6/1996 | Davis |
| 5,904,337 A | 5/1999 | VanKirk et al. |
| 6,021,812 A | 2/2000 | Iwamoto et al. |
| 6,267,353 B1 | 7/2001 | Friedline et al. |
| 6,378,842 B1 * | 4/2002 | Frese et al. ............ 215/315.16 |

FOREIGN PATENT DOCUMENTS

| | | |
|---|---|---|
| DE | 3 613 779 | 10/1987 |
| DE | 199 40 471 | 3/2001 |
| EP | 0 376 502 | 7/1950 |
| EP | 0 838 617 | 4/1998 |
| EP | 0 843 116 | 5/1998 |
| EP | 0 864 788 | 9/1998 |
| JP | 55 107165 | 8/1980 |

OTHER PUBLICATIONS

Masoneilan Catalog BN6004 showing 36004 Paramax Flanged Control Ball Valve (2 pps.).
Fisher (Emerson) product flier PF51.3:V150 (1 page).
International Search Report for PCT Application No. PCT/US2004/030667; Nov. 30, 2004; 7 pages.

* cited by examiner

*Primary Examiner*—John Bastianelli
(74) *Attorney, Agent, or Firm*—Fish & Richardson P.C.

(57) ABSTRACT

A ball valve has a valve body defining an inner seat and having a fluid inlet and fluid outlet and a control ball element rotatably mounted in the inner seat. The control ball element has a partially spherical outer surface, a flow passage having a leading edge, a first inner control surface abutting the leading edge, and a second inner control surface abutting the leading edge at an angle oblique to the first inner control surface.

12 Claims, 3 Drawing Sheets

DUAL SEGMENT BALL VALVE

TECHNICAL FIELD

This application relates to a ball valve and a ball element used inside such a valve. In particular, the ball element has two leading edge profiles that provide dual flow characteristics in the ball valve.

BACKGROUND

Various types of valves are available to be used across a wide range of applications, such as chemical processing, water control, petroleum refining, and fluid transport. Ball valves are a very popular choice for many of these applications because ball valves are reliable and simple to use. A ball valve in its simplest form comprises a housing or body having passages in each end of the body that can be placed in line with, and attached to, a pipe carrying a fluid. A ball having a cylindrical flow passage drilled through it is then placed in the valve body. The ball can be rotated inside the body so that fluid flows when the flow passage in the valve is in line with the passages in the valve body and with the pipe, and fluid does not flow when the passage through the ball is cross-wise to the passages in the valve body and the pipe (i.e., when the pipe "sees" only the solid sides of the ball). In this manner, a ball valve can be turned from completely closed to wide open simply by turning the ball one-quarter turn. This turn can be provided manually or by an actuator, such as an actuator that may be driven by a signal from an automatic, computerized control system or by manually adjusting a switch.

It is also common to produce a ball valve in which the "ball" element is merely a partial segment of a full ball. In particular, the ball may include only enough material so that the hole in the body is fully blocked on the upstream side of the body when the valve is full-shut. Generally, this ball segment is only on the upstream or intake side of the valve, as there is little need to provide a blocking surface on the downstream side where the fluid is not impinging. Although the ball segment need not extend back to the middle of the valve to provide a seal, the ball segment can be formed to have tabs or ears that extend backward to accept the shaft or shafts on which the ball rotates in the valve body. Thus, when the valve is opened, the segment swings to one side of the flow path, and fluid flows past the backside of the ball segment.

While ball valves can be turned on or off easily, they also can be turned partway on or partway off to provide controlled, throttled fluid flow. When the valve is full-open, the cross-section of the fluid path through the valve will be circular, as the circular flow passage in the valve aligns completely with the circular hole in the body. As the valve is closed and the side edge of the flow passage in the ball (or the curved edge of a ball segment's back side) approaches the side edge of the flow passage in the body, the area through which fluid may pass goes from a circle, to a football shape, and then to a narrow vertical sliver that is pointed at the top and bottom, and that fattens slightly at the middle. In theory, a ball valve has an equal percentage type control characteristic, in that equal increments of relative ball rotation should yield equal percentage increments of the relative flow coefficient. The decreasing width and length of the flow path as a ball valve is closed, however, causes the valve to throttle more quickly with each corresponding degree of rotation than it did when the valve was full-open. In addition, the small sliver can create turbulence and pressure drop as a result of the Carnot effect. As a result, it can be difficult to provide precise control at very low flows using a ball valve.

For a control ball valve, the leading edge of the ball can have a major influence on the amount of fluid flow per degree of angular rotation, particularly when the valve is opened a very small amount. The leading edge is the edge that closes against the valve body as the flow path is fully blocked, and that faces the oncoming fluid flow when the valve is opened. Some prior ball valves have provided a smoothed v-notch shape on the leading edge of the flow passage or ball segment to better control the fluid flow characteristics of the valve, particularly at low flows. Other contoured leading edges may also be provided, and a contoured leading edge may be provided in combination with a contoured trailing edge having a different profile from the leading edge. However, while a contoured leading edge shape generally provides a more controllable response characteristic at lower flow openings, it typically limits the amount of fluid flow when the valve is at a high-flow condition. Therefore, it is desirable to have a control ball valve that provides good control characteristics and good low-flow and good high-flow characteristics.

SUMMARY

In general, a ball valve and a ball valve control element are disclosed for use in controlling fluid flow through the valve. The control element may be provided with two control surfaces on its inside portion, and the two portions can define two distinct leading edges for the control element where they intersect with a generally cylindrical outer surface of the control element.

In one embodiment, a ball valve is disclosed and comprises a valve body defining an inner seat and having a fluid inlet and fluid outlet, and a control ball element rotatably mounted in the inner seat. The control ball element has a partially spherical outer surface, a flow passage through said ball element having disposed on an upstream end of said flow passage, a leading edge, a first inner control surface abutting the leading edge, and a second inner control surface abutting the leading edge at an angle oblique to the first inner control surface. The first inner control surface may comprise a cylindrical surface having a first longitudinal axis and the second inner control surface may comprise a cylindrical surface having a second longitudinal axis that may be at an angle to the first longitudinal axis, such as an angle of about nine degrees. The leading edge may comprise a v-formation, and symmetric segments on each side of the v-formation, and the valve may also comprise a control shaft attached to the control ball element, and an actuator configured to rotate the control shaft in response to a control signal. The control ball element may also comprise a trailing edge abutting the first inner control surface, but not the second inner control surface, and a pair of descending ears may be provided on the control ball element, wherein each ear defines a cylindrical passage. Furthermore, the ball valve may comprises a pair of cylindrical extensions, wherein each extension is attached to a respective ear of the control ball element.

In another embodiment, a control ball element is disclosed, and comprises a ball segment having a partially spherical outer surface, a leading edge on the ball segment, and a flow passage through said ball element having a first inner control surface on the ball segment and abutting the leading edge, and a second inner control surface on the ball segment and abutting the leading edge at an angle to the first inner control surface. The first inner control surface may comprise a cylindrical surface having a first longitudinal axis, and the second inner control surface may comprise a cylindrical surface having a second longitudinal axis, at an oblique angle to the first longitudinal axis, such as at about a nine degree angle. The leading edge may comprise a v-formation and symmetric segments on each side of the v-formation, and the ball segment may comprise a trailing edge abutting the first inner control surface, but not the second inner control surface. The element may further comprise a pair of ears descending from opposing sides of the ball segment.

In yet another embodiment, a ball valve element is disclosed and comprises a ball segment having a substantially spherical outer surface, a top segment on a front edge of the ball segment and defining a top segment centerline, a pair of flaring segments defining a first leading edge on the ball segment, the flaring segments being symmetric to each other about the top segment centerline, and a pair of descending segments adjacent the flaring segments and symmetric to each other about the top segment centerline. The pair of descending segments are formed by the intersection of the outer surface, with a first inner surface of the ball segment. The pair of flaring segments may be formed by the intersection of the outer surface with a second inner surface of the ball segment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
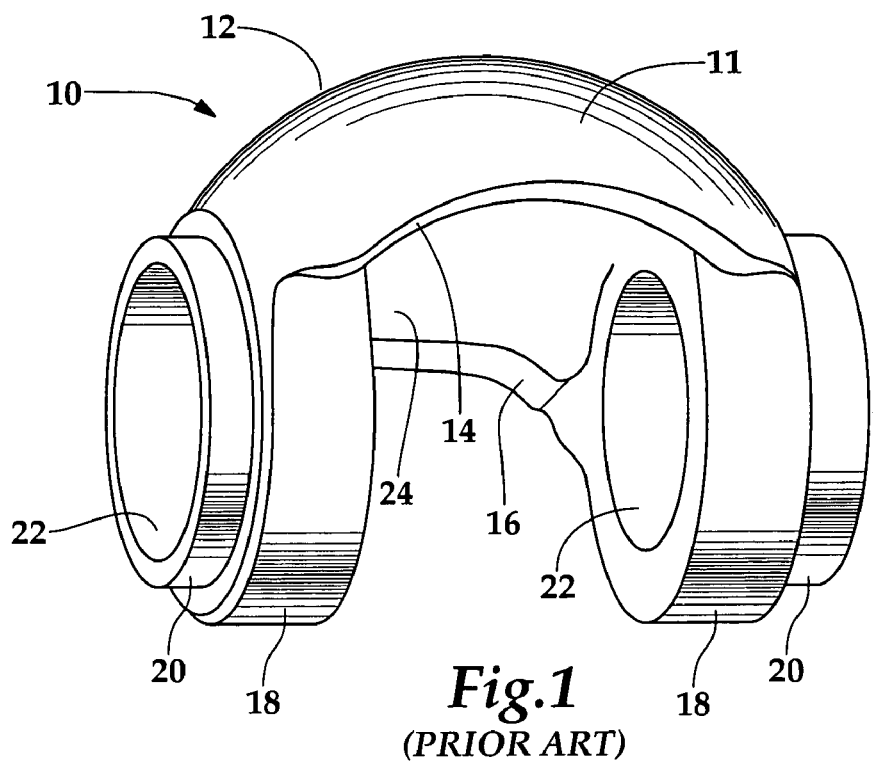
FIG. 1 is a perspective view of a prior art control valve ball.

FIG. 1 is a perspective view of a prior art control ball element 10, showing some of the general features of a ball element. A ball segment 11 is formed from a thickness of material on one side of ball element 10. Ball segment 11 has a generally spherical convex outer surface 12, which allows the control ball element to rotate smoothly within a valve body (not shown). A flow passage 13 extends from one side to the opposite side of ball segment 11—the upstream to the downstream side when the ball is open. The inner surface 24 of ball segment 11 may take a convex form that generally matches the form of outer surface 12, so that ball segment 11 has a substantially constant thickness. Ball segment 11 has a leading edge 14, which is the edge that is first contacted with fluid flow into the valve. Leading edge 14 has a slightly curved surface in the form of a smooth arc, much as the leading edge on a full size ball having a cylindrical hole drilled in it would have an arced shape (i.e., the arc being the portion of the circle formed by the hole). Ball segment 11 also has a trailing edge 16 opposite the leading edge 14. The trailing edge 16 is generally flat in shape with slight curved tapers at each end. A pair of ears 18 extend downward on each side of ball segment 11. The ears 18 are generally round at their bottom edges, and define generally circular shaft passages 22 through their centers. The shaft passages 22 are configured to receive a ball valve shaft and bushings used to rotate the control ball element 10 when it is mounted in a valve body. Extensions 20 reach outward from each ear 18 around the periphery of the passages 22. These extensions 20 can mate with corresponding forms in the valve body to hold control ball element 10 in place and allow it to rotate smoothly, via a bushing-like fitting.

Figure 2:
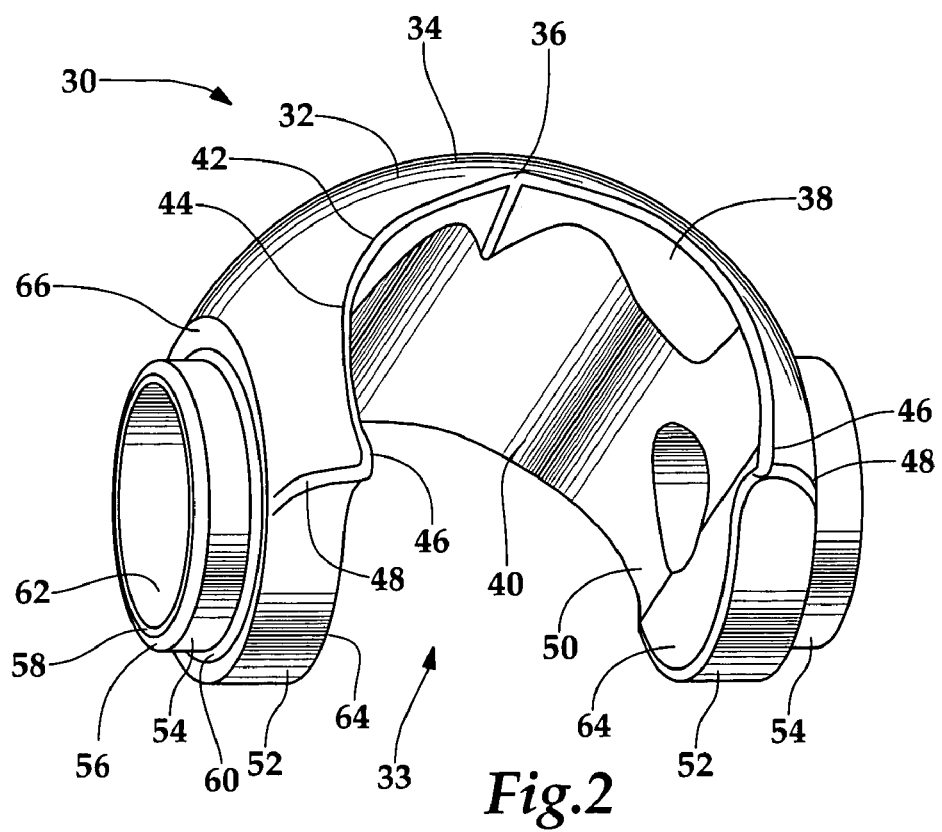
FIG. 2 is a perspective view of a control valve having dual characteristics.

FIG. 2 is a perspective view of a control ball element 30 having dual characteristics. The element 30 has a ball segment 32, with a pair of ears 52 extending downward from each side of the ball segment 32. The ball segment 32 has a generally spherical outer surface 34 that enables the ball segment 32 to rotate smoothly inside a ball valve housing or body as the valve is rotated. The outer surface 34 wraps downward around the sides of ball segment 34 to flat shoulders 66 on each side of the control ball element 30. Bushing bosses in the form of extensions 54 form passages 62, reach outward from each shoulder 66, and can meet the shoulders 66 at a smoothed radius 60. Each extension 54 is topped by a land 58 that abuts a slight chamfer 56. The extensions 54 are sized to mate with corresponding forms in a valve body, and chamfers 56 can make it easier to fit the extensions 54 into the corresponding forms.

A flow passage 33 extends through ball segment 32. Flow passage 33 has a contoured leading edge that helps provide control ball element 30 with improved performance characteristics. The leading edge comprises a number of segments that are symmetric with respect to a front-to-back axial centerline of the control ball element 30. Starting at the center, there is a top segment 36 that serves as the rounded point of a v-formation. Flaring segments 42 extend downward and outward from the top segment 36 to form the v-formation. The flaring segments 42 may initially be straight as they move away from the top segment 36, but may then begin to curve slightly inward. In this way, the leading edge approximate the shape for a standard control ball element, in which a cylindrical hole is formed in a spherical ball, and is adjusted to provide a v-shape for better low-flow operation.

The flaring segments 42 meet descending segments 44 at the flaring segments' ends farthest from the top segment 36. The descending segments 44 continue the general curve started by the flaring segments 42, but can meet the flaring segments 42 at a slight angle. This angle is created because the ball segment has two different control surfaces on its inside. The trailing edge 50 follows the curve of the cylindrical hole.

A first inner surface 40 is generally defined by a cylindrical cut made through the center of the control ball element 30. It has a constant radius along a substantial portion of the cut, and thus may approximate the flow passage of a traditional ball valve. The first inner surface 40 is also shown to be substantially flat from front to back. Of course, as shown in the figure, the first surface 40 of flow passage 33 is only a portion of a full cylinder and forms a "U" shape, because the control ball element 30 does not comprise a full ball, and because the inner lower portions of ears 52 descend straight downward. As will be well understood, the first inner surface 40 could also take on a variety of other appropriate forms. For example, the surface 40 could have a changing radius throughout its periphery. It could also take on a concave or convex shape from front to back, rather than a flat shape, depending on the expected application of the valve.

A second inner surface 38 is also defined on the inside of ball segment 32. Conceptually, the second inner surface 38 is a second characterized cut milled on the inside of the ball segment 32 after the first inner surface 40 is milled as a round port through the ball. The second cut is made as a slightly v-shaped hole after the ball is tilted downward, for example, nine degrees, from its position for the first cut. The second inner surface 38 is generally flat from front to back, but tapers outward from the center of the control ball element as it moves from back to front. As a result, the open area of the flow passage 33 decreases as one moves backward toward the center of the control ball element 30 over the length of the second inner surface 38, and remains constant after the second inner surface 38 has terminated.

The leading edge also has symmetric segments 46 that reach from the descending segments 44 to points from which curved lateral segments 48 extend back to the ears 52, which have generally parallel inner edges 64 at their lower ends. Segments 46 are generally vertical and begin where the bottom edge of the first inner surface 40 ends. Each of segments 36, 42, 44, 46, and 48 can be provided with smoothly radiused, gently transitioning edges to allow for smooth travel of the valve seat over the segments as the valve is rotated toward a closed position. Together, the dual segment design has two leading edges or two leading edge portions that can provide both for good flow capacity and controllability without appreciable performance compromise.

The control ball element 30 can take a variety of forms, and be produced from a variety of materials. For example, the element 30 can be made from stainless steel, ceramic, or carbon steel, or from alloys such as Avesta, Hastelloy, Monel, Iconel, Stellite, Alloy 6, and Alloy 20. The ball control element 30 may also be chrome-plated or Stellite hard faced.

In an alternative implementation, the trailing edge 50 of the ball element 30 may also be provided with dual characteristics. For example, the parameters of the leading edge could be selected to provide certain flow characteristics while the parameters of the trailing edge could be selected to provide other flow characteristics. Although such an arrangement may compromise maximum flow capacity for the valve, it would enable the ball element 30 to be mounted two different ways to provide different performance. In this manner, a manufacturer could provide customers with additional performance options without the need for the manufacturer to make and stock as much inventory, and without the need for the customers to stock as many models either.

The parameters of a particular characterized cut are a consequence of the leading edge shape, which can be designed to provide a balance between fine stepped flow characteristic and flow capacity. The flow passage 33 may first be optimized to meet ANSI or other appropriate requirements. Next, the spherical diameter of ball element 30 and the bushing bosses may be sized to fit the valve body of the particular valve, with allowance for clearances and manufacturing tolerances. The clearance should be adequate for operation with the bottom bushing installed.

The V-characterized cut angle and flow passage 33 diameter of the ball element 30 may then be determined. The transitions at various points on the leading edge may be configured to minimize intrusion into the valve's flow stream and to take into account seat interference and overlap. (Seat overlap is the ball length minus the edge blends, and in practice, is the amount of ball rotation between shut off of flow and full closed position, assuming ninety degrees rotation.) When the valve is full open, the back of the ball should not intrude into the flow stream.

The selection of appropriate parameters for a particular valve, both for considerations of seat location and valve performance, is within the ability of one having ordinary skill. The goal for valve performance may include maximum flow capacity and a characterized "V" contour that provides adequate seat overlap and ninety degrees of actuation from full-open to full-closed. The various factors that may be considered include one or more of the following:

Ball segment angle: Increasing ball segment angle also increases ball length and seat overlap. For a given ratio of ball port diameter to ball spherical diameter, there is a maximum segment angle where the transition becomes an edge and increasing the angle further does not increase ball length.

V-characterized contour: increasing the contour (deviation from round) of the characterized cut shape results in an increase in the angle and/or depth of the cut and reduces seat overlap.

V-characterized cut depth and angle: increasing the cut depth decreases seat overlap. If the cut is too shallow, the "V" contour will be truncated at the ball port interface.

Ball spherical diameter: increasing spherical diameter increases seat overlap. It also increases the quantity of spherical ball surface wiped by the seat, per degree of actuation. A larger spherical diameter of a given ball length will clear the seat in fewer degrees of actuation.

Ball port diameter: increasing the ball port diameter cuts into the spherical diameter and decreases seat overlap. The ball segment angle should be balanced with the "V" characterized cut angle/depth and seat overlap so the cylindrical ball port is parallel to the flow stream at 90 degrees of rotation (full open).

Leading edge blend: increasing the leading edge blend length decreases seat overlap. The blend length and radius should result in a depth from the spherical ball surface that exceeds the seat assembly interference.

Ball length: increasing ball length increases seat overlap. Ball length is measured by the linear distance from apex of the characterized v-notch to the other end of the ball spherical radius Seat diameter: increasing the seat inside diameter allows for higher capacity and decreases seat overlap.

Distance from seat to stem centerline: increasing the seat distance from the stem centerline increases seat overlap indirectly. To maintain seat-to-ball assembly interference with a longer seat-to-centerline distance, either the ball spherical diameter is increased (increasing overlap) or the seat inside diameter decreased (also increasing overlap).

Figure 3A:
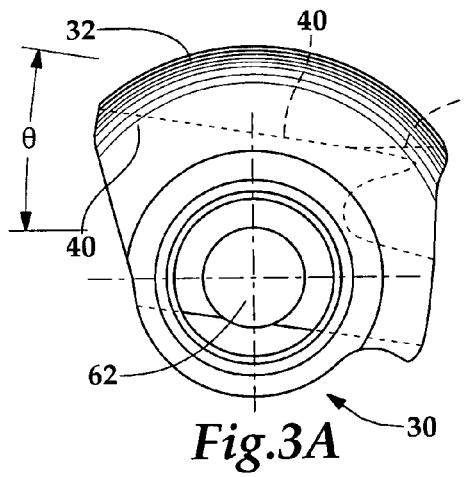
FIGS. 3a–3b are side, end, and perspective views of a control valve having dual characteristics.
Figure 3B:
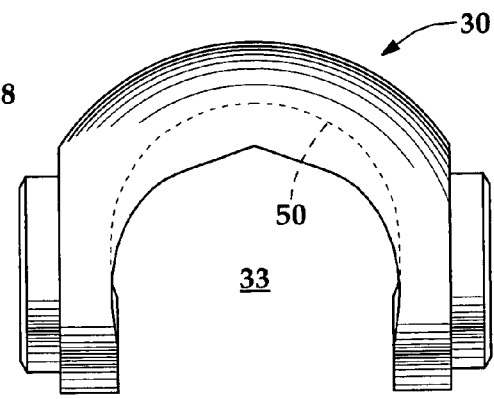
Figure 3C:
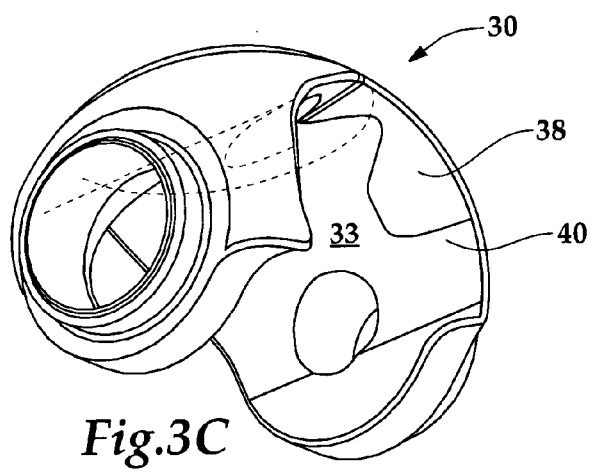

FIGS. 3a–3c are side, end, and perspective views, respectively, of the control ball element 30 of FIG. 2. As shown in FIG. 3a, in one particular embodiment for a two-inch ball valve, the first inner surface 40 may be provided at a nine degree angle to the second inner surface 38. The second inner surface 38 may be formed as a cut that is made perpendicular to an axis passing through the centerpoints of passages 62, and made 0.774 inches above the axis. Other dimensions and angles may be employed, as appropriate, and depending on the size of the valve. For example, the angle between the two cuts may be between about 6 degrees and about 12 degrees, and more preferably may be about 9 degrees.

FIG. 3b shows the front view of the control ball element 30, particularly showing the leading edge in solid line and the trailing edge in dashed line. In this figure, the v-formation can be seen at the center, with the flaring segments extending outward and downward, the descending segments continuing downward, and the final segments extending farther downward and then outward to the ears. The smooth curvature of the trailing edge can also be observed in the FIG. 3b. In addition, it can be seen that the passage in one ear is larger than the passage in the other so as to accommodate a bushing. FIG. 3c then provides a view similar to that of FIG. 2, but in a solid-line and hidden-line format.

Figure 4:
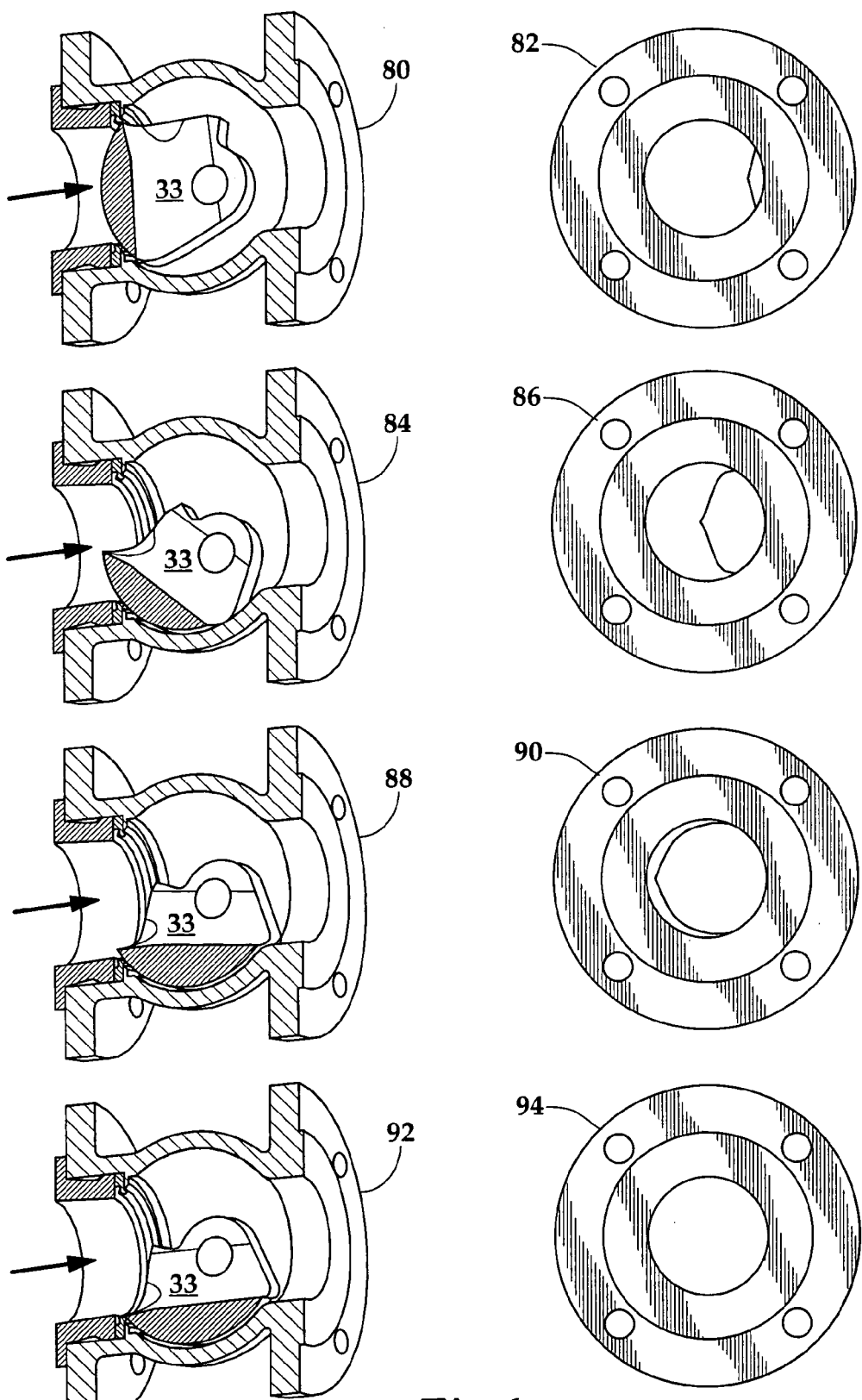
FIG. 4 shows cut-away perspective views and end views of a dual characteristic ball valve illustrating the control valve ball in various angles of rotation and corresponding end views illustrating the control ball in corresponding angels of rotation.

FIG. 4 shows cut-away perspective views and end views of a dual characteristic ball valve in various angles of rotation. Each pair of views provides a corresponding view for a particular rotation angle. The views in the right-hand column are taken from the left side of the valves shown in the left-hand column, and are rotated ninety degrees from the figures in the left-hand column. In view 80, the ball is rotated 5 degrees from full-closed, while in view 82, the ball is rotated twenty degrees from full-closed, and the flow path is presented as including the v-formation of the control ball element. In views 84, 86, the ball is rotated fifty degrees from full-closed. Here, a substantial portion of the leading edge is visible, and the general curved shape of the leading edge is exerting more influence on the fluid flow than is the v-formation. In views 88, 90, the ball is rotated eighty-one degrees from full-closed, and substantially all of the control ball segment is out of the path of the fluid flow. In views 92, 94, the ball is rotated ninety degrees from full-closed, and is thus full-open. The control ball element has disappeared out of the way of the fluid flow, thereby maximizing high flow characteristics. In addition, the second inner surface of the control ball element tapers slightly to the outside of the valve, so that the leading edge is slightly outside the diameter of the intake of the valve and is generally in line with a sealing ring. Thus, fluid entering the valve of view 92 from the left will avoid being caught on any lip of the control ball element that might otherwise stick up from the sealing ring. In this manner, fluid will flow more smoothly from the intake area of the valve and through the control ball element.

Figure 5:
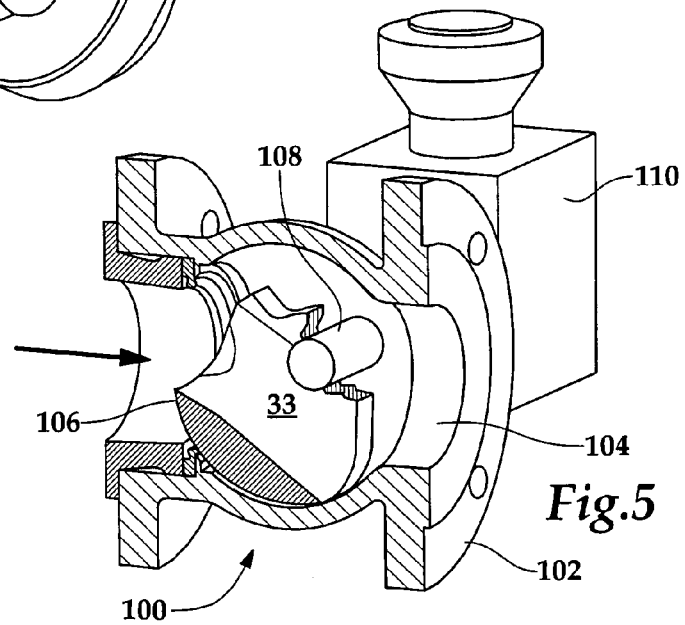
FIG. 5 shows a cut-away view of a ball valve assembly.

FIG. 5 shows a cut-away view of a ball valve assembly 100. The assembly 100 generally comprises a body 102 designed to receive fluid as indicated by the flow arrow. The valve body 102 has a central hollow cylinder 104 through which the fluid controlled by valve 100 is allowed to flow. A control ball element 106 is mounted in the hollow cylinder 104 and is able to rotate so as to block flow through cylinder 104 or to permit flow through cylinder 104. Cylinder 104 will generally be enlarged slightly at the location of control ball element 106 so that control ball element 106 can form a full seal around the periphery of the cylinder 104, and may also move out of the way of the fluid flow when the valve 100 is opened. Seats or seal rings (not shown) may be provided in the cylinder 104 and in contact with control ball element 106, to prevent fluid leakage when the valve 100 is closed. The seals may be formed of any appropriate material, including MN-7 polymer, metals, Teflon, or PTFE.

The control ball element 106 is rotated and driven by control shaft 108, which extends from the control ball element 106 to the outside of the valve body 102. A packing material or other sealing material may be provided between the control shaft 108 and the valve body 102 to prevent fluid from leaking out of the valve 100. As shown more clearly in the other figures, the control ball element 106 may include ears that define channels through which the control shaft 108 can be received, and on which the control ball element 106 may be mounted. In particular, to keep the control shaft 108 from interfering with the fluid flow, one ear of the control ball element 106 may be received in a pocket in the valve body 102, and the other ear may receive an end of the control shaft 108. The connection between the control ball element 106 and the control shaft 108 may use pins or keys, or spline connections. The control shaft 108 is driven by an actuator 110, which may be mechanical, electromechanical, pneumatic, or any other suitable form. Manual and/or computer generated signals may provide instructions to the actuator. The actuator may further be connected to an automatic control system, such as by a local area network, using protocols including the Ethernet protocol, which provide control signals to the actuator to cause it to change the position of control ball element 106.

A number of embodiments of the invention have been described. Nevertheless, it will be understood that various modifications may be made without departing from the spirit and scope of the invention. For example, the control surfaces may take various shapes and the control ball element may also take various shapes, and may be more or less of a complete ball than shown in the figures. Accordingly, other embodiments are within the scope of the following claims.

What is claimed is:

1. A ball valve, comprising:
    a valve body defining an inner seat and having a fluid inlet and fluid outlet; and
    a control ball element rotatably mounted in the inner seat, and having
    a partially spherical outer surface,
    a flow passage through said ball element having disposed on an upstream end of said flow passage,
    a leading edge,
    a first inner control surface abutting the leading edge, and
    a second inner control surface abutting the leading edge at an angle oblique to the first inner control surface;
    wherein the first inner control surface comprises a cylindrical surface having a first longitudinal axis and the second inner control surface comprises a cylindrical surface having a second longitudinal axis and the first longitudinal axis is at an angle between about six degrees and about twelve degrees to the second longitudinal axis.

2. The ball valve of claim 1, wherein the angle between the first longitudinal axis and the second longitudinal axis is about nine degrees.

3. The ball valve of claim 1, wherein the leading edge comprises a v-formation, and symmetric segments on each side of the v-formation.

4. The ball valve of claim 1, further comprising a control shaft attached to the control ball element, and an actuator configured to rotate the control shaft in response to a control signal.

5. The ball valve of claim 1, wherein the control ball element comprises a trailing edge abutting the first inner control surface, but not the second inner control surface.

6. The ball valve of claim 1, further comprising a pair of descending ears on the control ball element, wherein each ear defines a cylindrical passage.

7. The ball valve of claim 6, further comprising a pair of cylindrical extensions, wherein each extension is attached to a respective ear of the control ball element.

8. A control ball element, comprising:
    a ball segment having a partially spherical outer surface;
    a leading edge on the ball segment; and a flow passage through said ball element having
- a first inner control surface on the ball segment and adjacent the leading edge, and
- a second inner control surface on the ball segment and abutting the leading edge at an angle to the first inner control surface;

wherein the first inner control surface comprises a cylindrical surface having a first longitudinal axis and the second inner control surface comprises a cylindrical surface having a second longitudinal axis and the first longitudinal axis is at an oblique angle between about six degrees and about twelve degrees to the second longitudinal axis.

9. The control ball element of claim 8, wherein the angle between the first longitudinal axis and the second longitudinal axis is about nine degrees.

10. The control ball element of claim 8, wherein the leading edge comprises a v-formation and symmetric segments on each side of the v-formation.

11. The control ball element of claim 8, wherein the ball segment comprises a trailing edge abutting the first inner control surface, but not the second inner control surface.

12. The control ball element of claim 8, further comprising a pair of ears descending from opposing sides of the ball segment.

* * * * *